Patented May 13, 1941

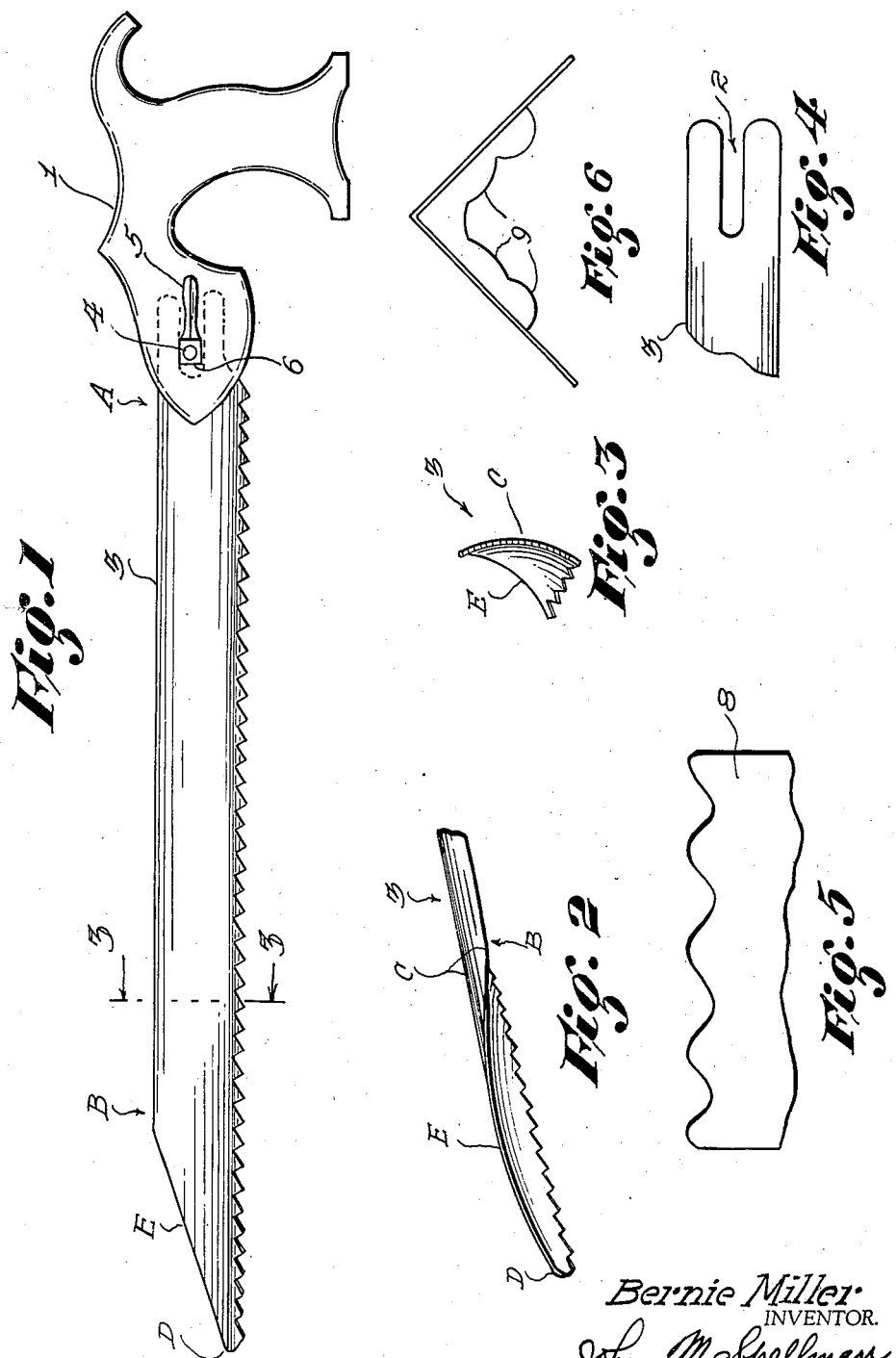

2,242,137

UNITED STATES PATENT OFFICE 2,242,137

CONCAVE COMPASS SAW

Bernie Miller, Dallas, Tex.

Application August 1, 1939, Serial No. 287,687

2 Claims. (Cl. 143—134)

This invention relates generally to compass saws, but more specifically to concave compass saws.

As presently constructed, key-hole or compass saws are not satisfactory in cutting round holes or circles in material, because such saws being flexible the back of the saw binds in the material or breaks. The primary object, therefore, of this invention is to produce a compass saw having a stiff blade made of first-class steel, the saw blade being concave, said concaved portion beginning at the handle of the saw and continuing to almost the end of the blade, where the blade then is curved either to the right or to the left. Wherever a circular opening or similar work such as curved parts of material is required to be made, this newly improved compass saw will enable the operator to do the work much faster, the blade, once started in the cut to be made, automatically guides itself around the circular area be cut. Concave compass saws have heretofore been made also, but the present saw being made relatively stiff and having a novel curved formation on its free end will perform the work in the manner referred to above.

For a clear understanding of the invention, reference is made to the drawing, accompanying this specification, and in the drawing:

Figure 1 is a side elevational view of a concave compass saw embodying the invention;

Figure 2 is a top or upper edge view of the free end of the saw blade;

Figure 3 is a cross-sectional of Figure 1, the view being taken on the line 3—3 of said figure;

Figure 4 is a detail view in fragment of the handle engaging end of the saw blade; and Figures 5 and 6 show diagrammatically curved or circular surfaces cut by the saw.

Refering more in detail to the drawing, the saw includes a conventional handle 1 which is provided with the usual slit or opening to receive one end of the blade which is slotted as at 2, Figure 4. This end of the saw blade 3 is slipped into the opening referred to and a bolt 4 in engagement with a small lever 5 and threaded at the end 6, is provided to compress and thus tighten the handle with the blade. However, no claim is made to any style or make of handle or of the means for removing the saw blades. Approximately a quarter turn of the lever 5 will serve to loosen or tighten the blade with the handle to remove or replace the blade.

The construction of the saw provides a blade of concave formation, beginning at the point A and continuing uniformly and of the same degree of curvature to the point B, the curved length being indicated in Figure 3 and also in Figure 2 at C. The blade is then curved to the left as will be clear from Figure 3 and brought to a pointed end D. The blade is intended to be made with the concavity and the end portion E on either side of the saw blade, that is a right and a left directional cutting blade. In Figure 5 is shown a piece of material 8 cut by right and left saw blades constructed in the manner referred to. In Figure 6 is shown a portion of a gable trim, the work requiring nicely finished cuts or circular areas which this saw is capable of doing, evidenced by the cuts 9.

The saw is very useful for use on construction jobs by plumbers, carpenters, electricians and air-conditioning craftsmen in cutting openings for pipe and will cut out a circle in material four times faster than any other similar type of saw now in use. The saw may be made in various lengths, the width depending on the size of the circular opening to be made.

The invention is capable of modifications and alterations within the spirit thereof, such as will be in conformity with the following claims.

What is claimed as new is:

1. A compass saw having a concave blade and a handle for holding the blade, said concavity of the blade extending substantially the length of the saw blade, the end portion of the saw blade being curved slightly laterally and brought to a pointed end to direct the circular cutting operation of the saw.

2. A compass saw having a concaved blade and a handle therefor, said blade having its free end curved laterally of the longitudinal portion thereof, the blade being substantially concave from the handle to the end thereof, and the degree of the curvature of the concavity of the blade being the same throughout its length.

BERNIE MILLER.